United States Patent [19]

Hughes et al.

[11] 3,777,985

[45] Dec. 11, 1973

[54] WATER HEATER

[75] Inventors: Robert L. Hughes; John E. Rouse, both of West Covina, Fla.

[73] Assignee: Vaskor Industries, Inc., Glendora, Calif.

[22] Filed: July 27, 1972

[21] Appl. No.: 275,626

Related U.S. Application Data

[62] Division of Ser. No. 143,899, May 17, 1971, Pat. No. 3,704,629.

[52] U.S. Cl............................... 239/555, 239/558
[51] Int. Cl.............................................. B05b 1/14
[58] Field of Search................ 239/554, 555, 553.5, 239/553, 557, 558, 566, 567, 552, 559, 568, 548

[56] References Cited
UNITED STATES PATENTS

| 2,965,165 | 12/1960 | Arnott et al. | 239/568 X |
| 2,235,635 | 3/1941 | Herman | 239/555 |
| 2,860,696 | 11/1958 | Reinhart | 239/559 X |
| 766,636 | 8/1904 | Machlet, Jr. | 239/554 X |
| 2,023,624 | 12/1935 | Tullis | 239/555 |
| 3,088,271 | 5/1963 | Smith | 239/555 X |

FOREIGN PATENTS OR APPLICATIONS

| 1,208,510 | 10/1970 | Great Britain | 239/568 |

Primary Examiner—M. Henson Wood, Jr.
Assistant Examiner—John J. Love
Attorney—D. Gordon Angus et al.

[57] ABSTRACT

A water heater for heating water as it is being delivered, commonly called an "instantaneous water heater." The heater includes a plurality of concentric tanks which are at least partially axially overlapping and which are spaced from one another to pass hot gases in heat transfer relationship with their sidewalls. The sidewalls of the tanks are generally cylindrical. The tanks are interconnected so as to permit the flow of water to and from each of them. An inlet manifold discharges into each tank, preferably along an axis which is skew to the central axis whereby to give the water, as it flows through the tank, both a circumferential and an axial component, thus aiding in keeping the tank clean and preventing thermal "stacking" of the water. The tanks are preferably formed from concentric half-shells which are welded together at their end seams, and which have telescopic necks projecting from their sidewalls that are welded together to form a structural joinder and a fluid interconnection. A burner is placed beneath the group of tanks with deflector jets which aid in confining the rising products of combustion to a relatively narrow cross-section, so as to inject a maximum BTU input into a relatively small heater cross-section.

5 Claims, 14 Drawing Figures

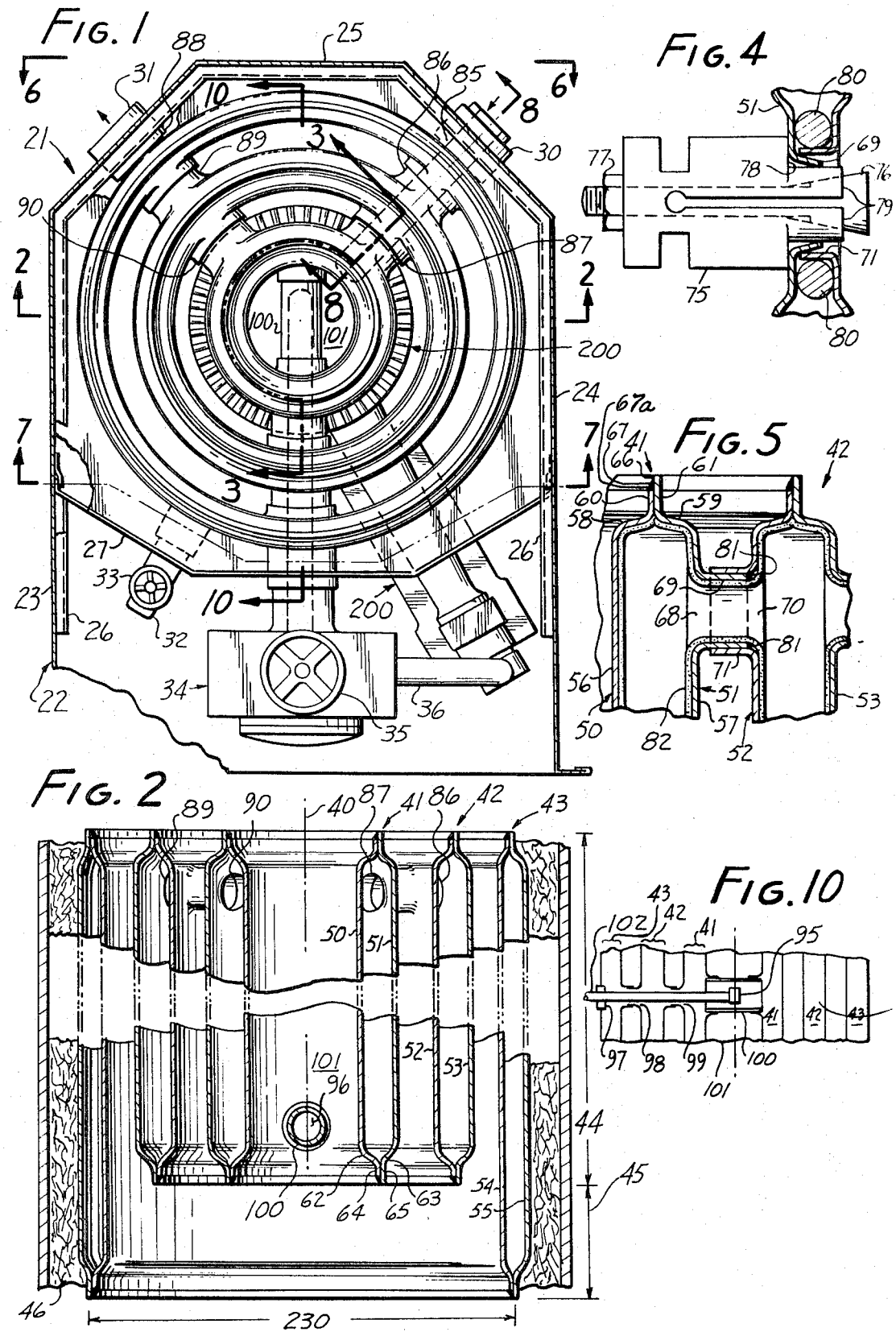

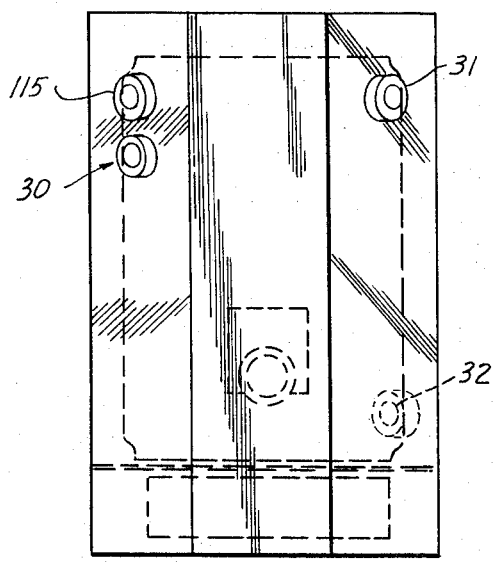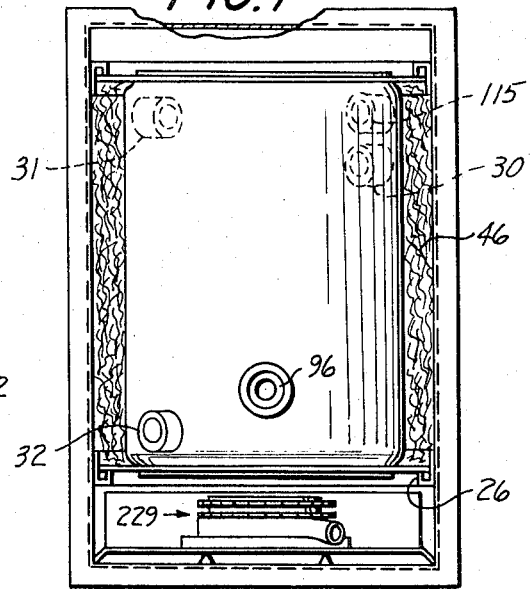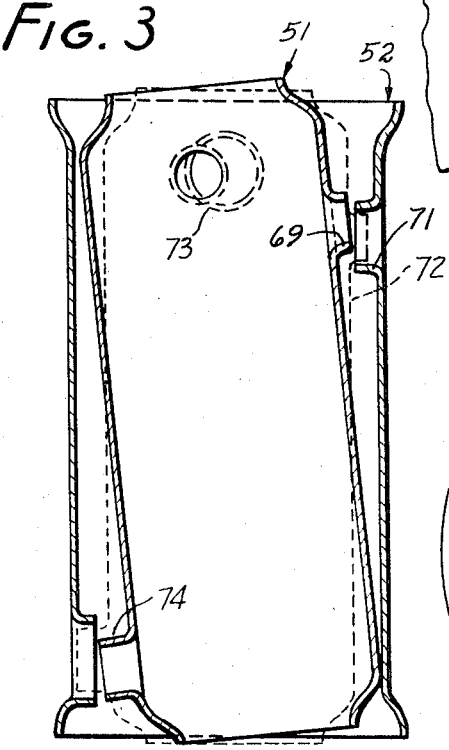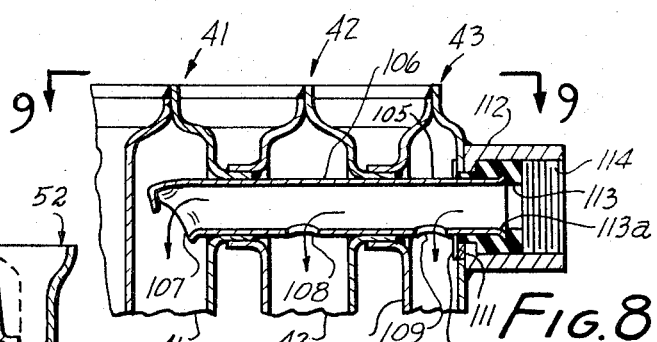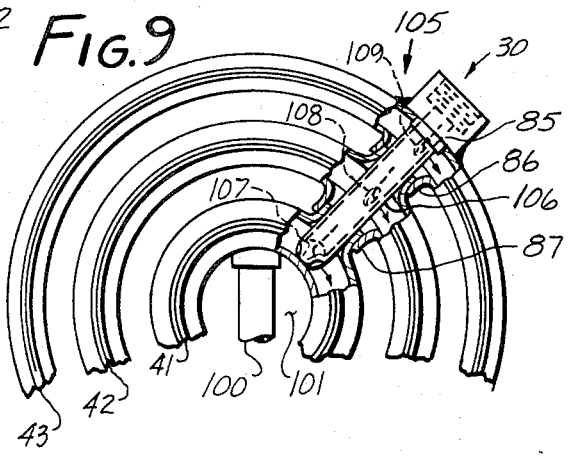

WATER HEATER

CROSS-REFERENCE TO CO-PENDING PATENT APPLICATION

This patent application is a division of applicant's presently pending United States patent application, Ser. No. 143,899, filed May 17, 1971, now U.S. Pat. No. 3,704,692, issued Dec. 5, 1972, entitled "Water Heater."

This invention relates to instantaneous water heaters. An instantaneous water heater is one in which only a minor storage capacity is provided, and the water is heated to its desired temperature as a constant flow process. The amount held in storage is usually just enough to take care of a minor amount of flow at the start of the process, and is kept hot by the heat from the burner's pilot flame. Such a heater finds its widest usage in cramped quarters such as trailers, campers and the like, where space is at a premium, but in which a substantial and unlimited flow of hot water is desirable. In such an environment, too little space for storage capacity is avialable for a standard tank-type heater to be useful.

By the use of this invention it has been found possible to provide flow rates on the order of 0.5 gallon per minute of water heated to 160° F. from an inlet temperature of 60° F. In so doing, a burner is used which utilizes and puts through the heater approximately 35,000 BTU per hour in the form of effluent gases from the combustion of liquified petroleum gas. Such a water heater is later described in this specification, and has a height from tank top to burner bottom of only about 14 inches, and a maximum tank diameter of about 8 inches. This is a very small assembly for such an output.

It is an object of this invention to provide an instantaneous water heater which is of rugged construction, which is relatively simple to manufacture, and which requires only a minimum lateral cross-section while accommodating efficiently an optimum BTU throughput.

It is another object of this invention to provide a construction which may readily be manufactured from simple spinnings and stampings, and be assembled by relatively simple assembly techniques such as seam welding and spot welding so as to reduce the overall cost of the device.

It is still another object of this invention to produce a device in which there is no "stacking" of the heated water, i.e., a striation of various temperature zones, and in which the tank is scoured clean as a consequence of the water flow through it.

A water heater according to this invention comprises a plurality of hollow, annular, concentric tanks which have a common central axis. Each tank has a cylindrical wall of substantial axial length. The tanks are at least partially axially coincident (that is, they axially overlap one another). The inner and outer diameters of the tanks are selected such that there is an annular axial gas passage whose contents such as hot flowing gases will be in heat transfer relationship with at least one cylindrical wall of each tank, and both walls of some tanks. The gas passages extend between adjacent tanks and through a central passage formed by the innermost one of the tanks. A hot water port enters each tank at an upper level for withdrawing hot water therefrom. A cold water port enters the tank, also at an upper level, for introducing water into the respective tank. An orifice discharges cold water into each of the tanks, these orifices discharging the water in a direction which has both a downward and a circumferential component of motion so as to cause a swirling cleaning and mixing movement of the water in the tanks.

Sensor means is disposed in the heater at a lower level. A gas burner is disposed beneath the tanks so as to discharge gases of combustion upwardly into the gas passages, and gas control means responsive to the sensor means and acting as a thermostat is provided for controlling the supply of gaseous fuel to the burner.

According to a preferred but optional feature of this invention, the hot water ports of adjacent tanks are interconnected by a hot water passage, and the cold water ports are also interconnected. According to still another preferred but optional feature of the invention, the tanks are interconnected by necks which are formed integrally with each and are welded to the neck of the neighbor tank.

According to still another preferred but optional feature of the invention, each tank consists of an inner tube and an outer tube, each tube having a central axis, a central cylindrical portion and a joggle at both ends. A cylindrical flange is provided at the free end of each joggle, the flanges being so proportioned and disposed as to abut one another when one tube is inside the other so that the flanges can be welded together to close the tank.

According to still another preferred but optional feature of the invention, the burner comprises a structure having a plurality of radially outwardly directed primary gas ports, and beneath them a plurality of radially discharging deflector ports at a lower elevation than the adjacent primary gas ports. Each deflector port extends angularly to bridge the primary gas ports between which it lies, but the deflector ports do not underlay at least the central portion of the primary gas ports. Flames from the deflector ports rise to deflect the flames from the primary gas ports and confine the effluent gases to a minimum cross-section.

The above and other features of this invention will be fully understood from the following detailed description and the accompanying drawings in which:

FIG. 1 is a top view of the presently preferred embodiment of the invention;

FIG. 2 is a cross-section taken at line 2—2 of FIG. 1;

FIG. 3 is a fragmentary axial cross-section taken at the compound section line 3—3 in FIG. 1, showing a feature of the assembly of the invention;

FIG. 4 is a fragmentary cross-section, showing another step in the assembly of the device;

FIG. 5 is a fragmentary axial cross-section, showing certain details of construction of a portion of the device of FIG. 1;

FIG. 6 is a side view taken at line 6—6 of FIG. 1;

FIG. 7 is a cross-section taken at line 7—7 of FIG. 1, showing the front of the device;

FIG. 8 is a fragmentary axial cross-section, showing a detail of FIG. 1, taken at line 8—8 thereof;

FIG. 9 is a top view, partly in cutaway cross-section, taken at line 9—9 of FIG. 8;

FIG. 10 is a schematic view of a portion of the invention taken at line 10—10 of FIG. 1;

Figure 11:
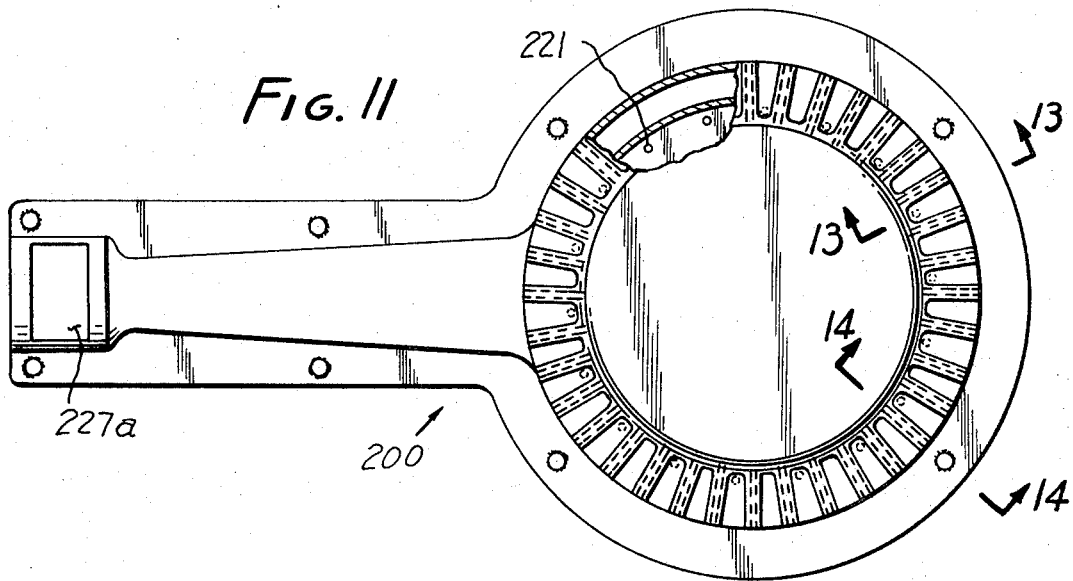
FIG. 11 is a plan view, partly in cutaway cross-section, of the preferred gas burner for use with the tank of FIG. 1.
Figure 12:
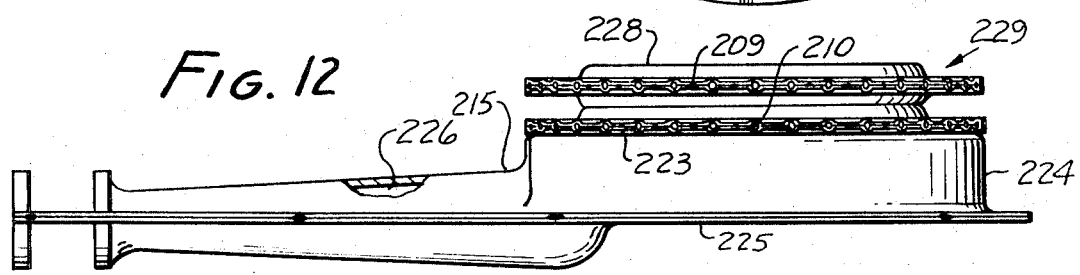
FIG. 12 is a side elevation of FIG. 11.
Figure 13:
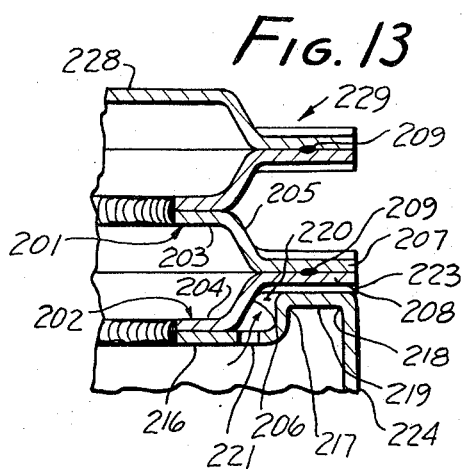
Figure 14:
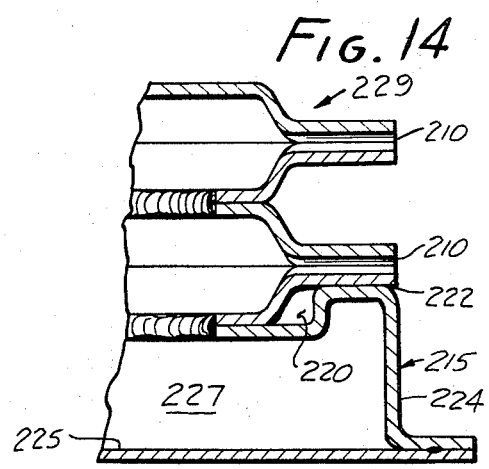

FIGS. 13 and 14 are fragmentary cross-sections taken at lines 13—13 and 14—14, respectively, of FIG. 11.

FIG. 1 shows heater 21 according to the invention in an enclosure 22. The enclosure has sides 23, 24 and a rear panel 25. This enclosure is metallic and fireproof in accordance with customary requirements. A track 26 is part of the enclosure, and a base member 27, upon which the heater rests, is engaged to the track so that the entire heater assembly can readily be slid in to and out of the enclosure.

A hood or other top cover (not shown) may be provided as desired for the assembly. Appropriate cutouts or passages may be provided for connections to the tank. As to the heater itself, it has a cold water inlet 30, a hot water outlet 31, both of these being at upper elevations of the heater, and a drain outlet 32 with a drain valve 33 controlling the same.

Gas control means 34, in this case a thermostat valve 35, is responsive to a sensor yet to be described. This means controls the flow of gas through a gas pipe 36 to a burner 200. The burner will be described in greater detail below.

As can be seen in FIGS. 1 and 2, the heater consists of a group of concentric, hollow, annular tanks. They all have a common axis 40, and in the example given, there are three tanks, inner tank 41, middle tank 42, and outer tank 43. It is evident that more or fewer tanks may be provided depending upon the capacity desired.

As can be seen from FIG. 2, there is an axial length 44 within which all of the tanks are axially coincident (overlapped), while there is another length 45 along which the outer tank extends to a lower region so as to form a skirt that tends to direct and confine hot gases in the region within the outer tank. A layer of insulation 46 surrounds the heater and abuts it and the enclosure.

As can also best be seen in FIGS. 1 and 2, each tank comprises a pair of concentric half-shells, which abut each other at their ends and are joined in pairs by welding to form the tanks. For example, tank 41 consists of inner and outer half-shells 50,51, tank 42 consists of inner and outer half-shells 52, 53, and outer tank 43 consists of inner and outer half-shells 54, 55.

In FIG. 5 the details of construction of the tanks are best shown. There is a substantial identity among the tanks so that only the construction of tank 41 will be described in detail. It has cylindrical outer walls 56, 57 disposed on half-shells 50 and 51, respectively, and these extend for the major portion of length 44 of the tank. At each end, each half-shell has a joggle 58, 59, respectively, and at the end of each joggle there is a cylindrical flange 60, 61, respectively. These flanges abut when the half-shells are slid together. The half-shells are simple steel spinnings or stampings which may readily be slid one into the other. Joggles 62, 63 and flanges 64, 65 are similarly formed at the other ends of the half-shells (FIG. 2).

Now returning to FIG. 5, an important detail of construction is shown. It will be noted that the axial length of flange 61 is greater than the axial length of flange 60, so that there is an underlapped area 66 on flange 61. A seam weld 67 may now readily be formed by simple welding techniques so as to join the two flanges together in a fluid-tight continuous seal around the end of the tank, the weld joining the end edge 67a of flange 60, and area 66 of flange 61. The term "end edge," as used to describe edges such as end edge 67a, is sometimes referred to as a "free edge," and means the edge of the respective flange which is farthest removed from the central cylindrical outer wall of the respective half-shell. Such a weld is formed at both ends of the tank, and the tank is now fluid-tight. This is simple and reliable weld to make. The term "free end," as used in connection with the joggles, means the end of the respective joggle which is farthest from the central cylindrical outer wall of the respective half-shell. As another example of a suitable weld construction, the end edge ("free edge") of two flanges may be directly welded together, instead of welding the free edge of one flange to the side of the other flange.

Before the tank was assembled, a port 68 was formed in the wall of half-shell 51, with an integral tubular neck 69, which extends laterally out from the cylindrical wall. Similarly, in neighboring half-shell 52 of tank 42, a port 70 was formed with a tubular neck 71 projecting therefrom. For convenience in disclosure of the technique of joining these together, FIG. 3 is taken as a compound section taken at a bent section line in FIG. 1. It shows the assembly of the necks 69 and 71.

In order to join the adjacent tanks together through these necks, the outer half-shell 51 of tank 41 is slid inside the inner half-shell 52 of tank 42 and tilted as shown in FIG. 3. This permits the ends of the respective tubular necks to pass each other, and then the tanks may be tilted back to the position shown in dotted line 72, which is their ultimately intended respective position. This telescopes the necks, the diameters being such that one can readily enter the other. Another set 73 of necks and ports is shown in the back wall of FIG. 3. These tubular necks are telescoped in a manner similar to those already shown in FIG. 3, along with still another set 74 at the lower end. Suffice it to say that the tanks may be moved so as to axially coincide with one another and be tilted and rotated as necessary in order to cause all of the necks to telescope at once. The lengths and diameters of the necks are selected so as not to interfere with this function.

Thereafter, an assembly technique shown in FIG. 4 is accomplished at each set of ports and necks. It is shown bringing together necks 69 and 71 by the expansion of one of them. For this purpose, there is provided a split expansion collet 75, which has within it a tapered expander bolt 76. A nut 77 draws the tapered expander bolt into the collet itself. A shoulder 78 on the collet bears aganst the inside of half-shell 51, and the expansion collet has leaves 79 which bear outwardly against neck 69 which, when the expander bolt is pulled back into the collet, will expand the neck 69 so as to deform it into full bearing contact with neck 71. This is accomplished while the two half-shells are held in a jig with spacers 80 accurately spacing them apart. These spacers will be removed after the necks have been bent to the final configuration, as shown in FIG. 5, after which the necks will be welded together by weld 81.

After similar neck connections are made at all neck junctions between all of the tanks, the mating half-shells of tanks 41 and 42 (i.e., half-shells 50 and 53) are slid axially into place, and the peripheral seam welds 67 are formed. Half-shell 53 will already have been attached to half-shell 54. Thereafter a glass lining 82 may be applied to the inside of the tank by known techniques.

There results the basic tank configuration, shown in FIGS. 1 and 2, in which all of the tanks are joined structurally by attachment at the necks. The joinder formed by the necks is sometimes called "structure" which structurally interconnects adjacent tanks. It is to be realized, of course, that different structures could be utilized, such as mechanical interconnection of the tanks without fluid interconnecting means, and the fluid interconnecting means between the tanks could instead be provided by external conduitry. The presently preferred embodiment of the invention, however, is rugged, simple to manufacture and is as shown.

Further, with details of the resulting tank construction, it will now be seen (FIG. 9) that cold water port 85 enters through the outer wall of tank 43, cold water port 86 interconnects tanks 42 and 43, and cold water port 87 interconnects tanks 41 and 42. Similarly, hot water port 88 (FIG. 1) enters the outer tank 43, hot water port 89 interconnects tanks 42 and 43, and hot water port 90 interconnects tanks 41 and 42. Ports 86, 87, 89 and 90 are formed within respective necks as shown in FIG. 5. In any event, a cold water port enters each tank at an upper level for introducing water into the respective tank, and a hot water port enters each tank for withdrawing hot water therefrom at an upper level.

Sensor means 95, such as a thermocouple or temperature-sensitive signal generating device, is disposed in a lower region of the tank. It is schematically shown in FIG. 10 in its respective position. To accommodate the same, a sensor passage 96 is formed. It is evident that the sensor can be placed in any one of the tanks, but it has been found desirable to place it in a region yet to be described and in fluid communication with all of the tanks. Accordingly, sensor ports 97, 98 and 99 are formed, as indicated in FIG. 10, and a tube 100 extends across gas passage 101 in the center of tank 41 so as partly to occlude the same, and the sensor is disposed in this portion of the tube. Tube 100 may be considered as a part of tank 41. The sensor is in communication with both sides of tank 41 (and may therefore be considered as located in tank 41) and also with tanks 42 and 43, which is a favorable condition.

The sensor passage is manufactured by the same technique as shown in FIGS. 3–5 and, in fact, forms set 74, just as set 73 forms the sets of hot water ports. However, the tube forms a splice between two opposed necks integral with half-shell 50. The tube is slid into place and expanded to fit before half-shells 50 and 51 are welded together, and prior to the glass lining operation.

A support 102, which does not plug the sensor ports, but instead permits flow therethrough, supports the sensor in its illustrated position and carries leads or other signal-conducting means (not shown) to the gas control means 34, which in turn controls the supply of gas to the burner.

If slow, circumferential movement of water were permitted in a tank of this type, without a pronounced vertical component of motion, a definite thermal gradient would be observed, and also there would be a fairly rapid sedimentation toward the bottom of the tank. In order to avoid this condition, the cold water is injected into the tank through the cold water ports by means of a cold water injector 105, which is best shown in FIGS. 8 and 9. This injector comprises a pipe 106, which has three injector ports 107, 108, 109 discharging into tanks 41, 42 and 43, respectively. Ports 108 and 109 are formed by partially recessing the wall of the pipe by means such as dimpling, and then drilling the holes as shown so as to give a lateral direction to the departing water. Port 107 is formed by turning over leaves at the end of the pipe so as to form the port as illustrated.

The directions of discharge of the ports 107, 108 and 109 are generally parallel to each other, and their flow is downwardly into the tanks, and their orientation is about 10° from the vertical so as to discharge in a path which is both axial and circumferential so as to give a swirling, spiral pattern to the water in the tank. In order to provide for proper orientation of the ports, a key 110 is formed on the pipe which fits into a slot 111 in the wall of tank 43 for alignment purposes. A coupling nut 112 is welded to tank 43. A washer 113 is held within it, and a flare 113a on the pipe bears against it. Internal threads 114 will receive the end of the cold water supply line. The hot water outlet may be threaded in like manner so as to receive a hot water outlet line.

In addition to the foregoing, there is provided an anti-corrosion anode 115 (FIG. 7) in the tank above the cold water inlet. This is a typical magnesium anode which reduces corrosion during the lifetime of the heater.

It will now be seen that there is provided an optimal heater, utilizing very simple shapes for its construction, for example, simple spinnings, and which can be assembled by common expansion and welding techniques. A fluid-tight, reliable and long-lived tank results which is of minimum cross-section area for the throughput of water, and therefore occupies the least necessary envelope, which is particularly desirable in areas where space is at a premium, such as in recreational vehicles.

It has been found that prior art gas burners are not adequate for this heater shown above, should its maximum benefits be desired. This is for the reason that, if it requires a given throughput of BTUs, it does little good to minimize the cross-section of the tank if the burner is unable to confine the heating gases to this area. A simple blow-torching effect will not do because such a flow of gases is far too rapid and uneven. Conventional gas burner techniques, in which the flame base is spread out, is necessary as a practical matter. However, the plan area required by a conventional burner for the BTU throughput which can be accommodated by this invention is much larger than the available cross-section. Accordingly, it has been found useful, because it enlarges the range of utility of this tank, to use the burner shown in FIGS. 11–14. Then the water flow rate for a given water temperature differential can be increased, or for a given water flow rate the outlet temperature can be higher than if commonly known burners were used.

It is a further object of the invention to provide a gas burner which can be made from simple stampings and with simple manufacturing techniques, such as spot welding and stampings. This burner can use sets of gas ports at one or at a plurality of elevations. In this case, two sets are provided at two elevations.

A gas burner 200 according to this invention comprises a pair of orifice rings 201, 202, which are mirror images of each other. Each of these rings comprises a flat annulus 203, 204, a peripheral joggle 205, 206, and an undulating flange 207, 208, all respectively. The undulating flanges are placed in abutment with each other and each is joined to its neighbor by spot welds 209. Were only one pair of orifice rings used in the burner, then the top annulus 203 would be covered with a cover as will yet be described, and only one set of gas ports would be provided.

The undulating flanges are placed together so that portions such as shown in FIG. 13, are closed, and primary gas ports 210, as shown in FIG. 14, are formed between these portions. Therefore, by simply joining two mirror image orifice rings, the primary gas ports can readily be formed. These ports are directed radially outward from the inside to the outside of the rings.

A base 215 is formed beneath the orifice rings. The base has an inner annulus 216, which is in abutment with and joined to annulus 204 of ring 202. A pair of re-entrant bends 217, 218 are formed, between which there is a support annulus 219, radially spaced from the joggle 206 of the adjacent orifice ring 202, so as to form a peripheral gas chamber 220 therebetween. A hole 221 passes through the inner annulus to the peripheral gas chamber to admit gas-air mixture thereto.

Undulating flange 208 forms regions, such as shown in FIG. 14 as region 222, where the junction is closed, and forming a plurality of radially-discharging deflector ports 223, as shown in FIG. 13, discharging from the peripheral chamber. Hole 221 (or a plurality of them) meters the gas-air flow through the deflector ports to a lesser flow rate than the flow rate through the primary gas ports.

A skirt 224 on the base is contiguous to and continuous with bend 218 and extends downwardly where it is attached, such as by spot welding, to a base plate 225 which closes the lower end of the burner. An inlet venturi passage 226 extends to the supply chamber 227 formed above the base plate 225. Passage 226 is connected to gas pipe 36, and air ports 227a admit air to the gas in accordance with known burner techniques. A closure 228 comprising an imperforate metal area on the uppermost of the orifice rings completes the enclosure of the burner. Only one group of orifice rings is necessary, and these are already described. However, a second set 229 can also be used by the simple construction shown in FIGS. 13 and 14, in which case the uppermost orifice ring will carry the closure 228 as illustrated, and this provides a second set of primary gas ports.

As can be seen in the drawings, the centers of the primary gas ports are at an elevation above the centers of the deflector ports. The centers of the primary gas ports lie on the plane where the orifice plates meet, while the centers of the deflector ports lie midway between the top of support annulus 219 and that part of the undulating flange 208 which forms the deflector port (see FIG. 13). Each deflector port extends angularly to bridge the primary gas ports which it lies between. However, the deflector ports do not underlay at least the central part of the primary gas ports. With this construction, the flames of the deflector ports interlink the flames of the primary gas ports, but they do not consume air from directly beneath the primary gas ports. When a plurality of rows of primary gas ports is provided, only the lower row has deflector ports, and the primary gas ports are disposed one above the other. The structure enclosing supply chamber 227, and through which the various ports pass, is sometimes called a "burner body."

It has been found that when this burner is operated, and if the deflector ports are plugged, the gas flame jets out for a very substantial peripheral distance, and the heater with the illustrated cross-section could not readily be used. However, when the deflector ports are lit, their small flame, burning upward, steeply deflects the flame from the primary ports upwardly and substantially confines the flame to a relatively small region. For example, in a heater of the capacity already described, and with a diameter 230 at the flanges (FIG. 2) of about 8 inches, a burner with an outer peripheral diameter of the orifice ring of about 4 inches, has been found suitable, and the flame will be entirely confined within the heater and is well-distributed in the construction shown. Similarly, it has been found in this device that a length 44 of about 11 inches and a length 45 of about 2 inches, with such a burner about 2 inches below the lower end of tank 41, is quite effective.

It will now be seen that the water heater is rugged, easy to construct and effective in its operation and that the burner enables it to be operated with BTU inputs and hot water output rates heretofore not believed to be possible in such a small envelope. Furthermore, the burner itself, while particularly well-suited for this installation, may be used in other gas burning installations, such as furnaces, air conditioners and the like. The utility of this burner is not limited to its use with the tank as illustrated, even though it greatly improves the performance of the tank itself.

This invention is not to be limited by the embodiments shown in the drawings and described in the description, which are given by way of example and not of limitation, but only in accordance with the scope of the appended claims.

We claim:

1. A gas burner comprising a pair of orifice rings, each ring comprising a flat annulus, a peripheral joggle, and an undulating flange, said undulating flanges being placed in abutment with and joined to the other to form angularly spaced-apart primary gas ports which are directed radially outward from the inside to the outside of said rings, a base having an inner annulus in abutment with and joined to the annulus of one of said rings, a pair of re-entrant bends and a support annulus between the bends, the support annulus being radially spaced from the joggle of the adjacent orifice ring so as to form a peripheral chamber therebetween, there being a hole through the inner annulus to the peripheral chamber, the undulating flanges forming a plurality of radially discharging deflector ports discharging from the peripheral chamber, the said hole metering flow through the deflector ports to a lesser flow rate than the flow rate through the primary gas ports, a skirt on said base contiguous to and continuous with the bend opposite the flange, a base plate attached to the skirt to form a supply chamber, there being an inlet venturi to said supply chamber for admitting a gas-air mixture thereto, and a closure carried by the orifice ring farthest from the base plate to close the supply chamber, whereby gas-air mixture discharges from the deflector ports and from the primary gas ports, the centers of the deflector ports being at a lower elevation than the centers of the primary gas ports, each deflector port extending angularly to bridge the primary gas ports which it lies between, but not underlaying at least the central part thereof.

2. A gas burner according to claim 1 in which the uppermost orifice plate and the closure constitute a continuous and integral body.

3. A gas burner according to claim 1 in which there are provided a plurality of pairs of orifice plates, the orifice plates being joined to each other at the edges of their adjacent annuli, and one of said orifice plates being joined at the edge of its innermost annulus to the inner edge of the inner annulus of the base, the deflector ports being disposed only at the lowermost set of primary gas ports.

4. A gas burner according to claim 3 in which the uppermost orifice plate and the closure constitute a continuous and integral body.

5. A gas burner according to claim 3 in which the pairs of orifice plates have identical primary gas ports, and in which respective primary gas ports of the pairs of orifice plates are disposed one above the other.

* * * * *